United States Patent
Chamberlain et al.

(10) Patent No.: US 11,223,387 B2
(45) Date of Patent: Jan. 11, 2022

(54) SMALL CELL BASE STATION ANTENNAS SUITABLE FOR STRAND MOUNTING AND RELATED SYSTEM ARCHITECTURES

(71) Applicant: CommScope Technologies LLC, Hickory, NC (US)

(72) Inventors: John C. Chamberlain, Hickory, NC (US); Michael R. Wolfe, Dallas, TX (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/765,254

(22) PCT Filed: Dec. 5, 2018

(86) PCT No.: PCT/US2018/063986
§ 371 (c)(1),
(2) Date: May 19, 2020

(87) PCT Pub. No.: WO2019/118241
PCT Pub. Date: Jun. 20, 2019

(65) Prior Publication Data
US 2020/0358476 A1    Nov. 12, 2020

Related U.S. Application Data

(60) Provisional application No. 62/599,067, filed on Dec. 15, 2017.

(51) Int. Cl.
*H04B 3/52* (2006.01)
*H01Q 1/24* (2006.01)
(Continued)

(52) U.S. Cl.
CPC ............... *H04B 3/52* (2013.01); *H01Q 1/246* (2013.01); *H01Q 3/30* (2013.01); *H01Q 13/02* (2013.01);
(Continued)

(58) Field of Classification Search
CPC ...... H01Q 19/10; H01Q 25/005; H01Q 1/246; H01Q 3/30; H01Q 21/205; H01Q 13/02;
(Continued)

(56) References Cited

U.S. PATENT DOCUMENTS 6,181,297 B1    1/2001  Leisten
9,019,161 B1 *  4/2015  Billsberry ............. G01S 13/933
                                                    343/705
(Continued)

FOREIGN PATENT DOCUMENTS

WO    2019/118116 A1    6/2019

OTHER PUBLICATIONS

International Search Report and Written Opinion of the International Searching Authority, International Application No. PCT/US2018/060896, dated Mar. 26, 2019, 15 pp.
(Continued)

*Primary Examiner* — Andrea Lindgren Baltzell
*Assistant Examiner* — Yonchan J Kim
(74) *Attorney, Agent, or Firm* — Myers Bigel, P.A.

(57) ABSTRACT

A small cell base station antenna includes a first backplane, a first linear array of radiating elements extending forwardly from the first backplane, a second backplane that is opposite the first backplane and a second linear array of radiating elements extending forwardly from the second backplane. The first backplane is inclined at a first oblique angle with respect to a vertical axis and the second backplane is inclined at a second oblique angle with respect to the vertical axis.

17 Claims, 8 Drawing Sheets

(51) Int. Cl.
    *H01Q 3/30*     (2006.01)
    *H01Q 13/02*     (2006.01)
    *H01Q 13/24*     (2006.01)
    *H01Q 21/20*     (2006.01)
    *H04W 16/28*     (2009.01)

(52) U.S. Cl.
    CPC ........... *H01Q 13/24* (2013.01); *H01Q 21/205* (2013.01); *H04W 16/28* (2013.01)

(58) Field of Classification Search
    CPC . H01Q 13/24; H01Q 1/44; H04B 3/52; H04B 7/0617; H04B 7/0452; H04B 7/10; H04W 16/28
    See application file for complete search history.

(56) References Cited

U.S. PATENT DOCUMENTS

| | | | | |
|---|---|---|---|---|
| 2004/0038714 | A1* | 2/2004 | Rhodes | H01Q 3/24 455/562.1 |
| 2004/0174317 | A1 | 9/2004 | Dearnley et al. | |
| 2006/0152410 | A1 | 7/2006 | Shi | |
| 2008/0212969 | A1* | 9/2008 | Fasshauer | H01Q 1/246 398/116 |
| 2011/0032158 | A1* | 2/2011 | Rodger | H01Q 1/42 343/702 |
| 2011/0134008 | A1* | 6/2011 | Schadler | H01Q 21/065 343/833 |
| 2011/0298682 | A1 | 12/2011 | Plet et al. | |
| 2011/0309996 | A1* | 12/2011 | Abumrad | H01Q 1/24 343/872 |
| 2012/0069882 | A1 | 3/2012 | Nino et al. | |
| 2014/0128032 | A1 | 5/2014 | Muthukumar | |
| 2014/0132473 | A1 | 5/2014 | Isom | |
| 2015/0091755 | A1 | 4/2015 | Chawgo | |
| 2016/0161053 | A1 | 6/2016 | Allen | |
| 2016/0248170 | A1 | 8/2016 | Bisiules et al. | |
| 2017/0194704 | A1 | 7/2017 | Chawgo et al. | |
| 2017/0317766 | A1 | 11/2017 | Vella-Coleiro et al. | |
| 2019/0379432 | A1* | 12/2019 | Monir Vaghefi | H01Q 1/246 |

OTHER PUBLICATIONS

International Search Report and Written Opinion of the International Searching Authority, International Application No. PCT/US2018/063986, dated Feb. 12, 2019, 10 pp.

* cited by examiner

SMALL CELL BASE STATION ANTENNAS SUITABLE FOR STRAND MOUNTING AND RELATED SYSTEM ARCHITECTURES

CROSS-REFERENCE TO RELATED APPLICATIONS

The present application is a 35 U.S.C. § 371 national stage application of PCT Application No. PCT/US2018/063986, filed on December 5, which itself claims priority under 35 U.S.C. § 119 to U.S. Provisional Patent Application Ser. No. 62/599,067, filed Dec. 15, 2017, the entire contents of both of which are incorporated herein by reference as if set forth in their entireties.

FIELD

The present invention relates to cellular communications systems and, more particularly, to small cell cellular base stations.

BACKGROUND

Cellular communications systems are well known in the art. In a typical cellular communications system, a geographic area is divided into a series of regions that are referred to as "cells," and each cell is served by a base station. Typically, a cell may serve users who are within a distance of, for example, 1-20 kilometers from the base station, although smaller cells are typically used in urban areas to increase capacity. The base station may include baseband equipment, radios and antennas that are configured to provide two-way radio frequency ("RF") communications with fixed and mobile subscribers ("users") that are positioned throughout the cell. The antennas are often mounted on a tower or other raised structure, with the radiation beam ("antenna beam") that is generated by each antenna directed outwardly to cover the cell or a portion thereof. Typically, a base station antenna includes one or more phase-controlled arrays of radiating elements, with the radiating elements arranged in one or more vertically-extending columns or "linear arrays" when the antenna is mounted for use. Herein, "vertical" refers to a direction that is perpendicular relative to the plane defined by the horizon.

In order to increase capacity, cellular operators have been deploying so-called "small cell" cellular base stations. A small cell base station refers to a lower power base station that may operate in the licensed and/or unlicensed spectrum that has a much smaller range than a typical "macrocell" base station. A small cell base station may be designed to serve users who are within short distances from the small cell base station (e.g., tens or hundreds of meters). Small cells may be used, for example, to provide cellular coverage to high traffic areas within a macrocell, which allows the macrocell base station to offload much or all of the traffic in the vicinity of the small cell to the small cell base station. Small cell base stations typically employ a single antenna that provides full 360 degree coverage in the azimuth plane and a suitable beamwidth in the elevation plane to cover the designed area of the small cell. In many cases, the small cell antenna will be designed to have a small downtilt in the elevation plane to reduce spill-over of the antenna beam of the small cell antenna into regions that are outside the small cell and also for reducing interference between the small cell and the overlaid macrocell.

SUMMARY

Pursuant to embodiments of the present invention, small cell base station antennas are provided that have a vertical axis running through a center thereof when the small cell base station is mounted for use. These small cell base station antenna include a first backplane that has a first linear array of radiating elements extending forwardly therefrom and a second backplane that is opposite the first backplane and that has a second linear array of radiating elements extending forwardly therefrom. Each of the first and second linear arrays includes at least one radiating element. These antennas are configured so that the first backplane is inclined at a first oblique angle with respect to the vertical axis and the second backplane is inclined at a second oblique angle with respect to the vertical axis.

In some embodiments, the first backplane is inclined in a first direction and the second backplane is inclined in a second direction that is opposite the first direction.

In some embodiments, the small cell base station antenna may further include a third backplane that is between the first backplane and the second backplane, a third linear array of radiating elements that includes at least one radiating element extending forwardly from the third backplane, a fourth backplane that is opposite the third backplane, and a fourth linear array of radiating elements that includes at least one radiating element extending forwardly from the fourth backplane. In some such embodiments, the third backplane may be inclined at a third oblique angle with respect to the vertical axis and the fourth backplane may be inclined at a fourth oblique angle with respect to the vertical axis. In some embodiments, at least one of the third oblique angle and the fourth oblique angle may be greater than the first oblique angle.

In some embodiments, the third backplane may be inclined in a third direction and the fourth backplane may be inclined in a fourth direction that is opposite the third direction.

In some embodiments, each of the first through fourth linear arrays of radiating elements may include at least two radiating elements.

In some embodiments, a 3 dB beamwidth of the first linear array of radiating elements in an elevation plane may be between about 25 degrees and about 60 degrees.

In some embodiments, the small cell base station may be configured to be hung directly or indirectly from a pole-mounted strand.

In some embodiments, the first through fourth backplanes may be part of a tubular housing. In some embodiments, the tubular housing may have a generally truncated rectangular pyramid shape.

In some embodiments, the antenna may include a strand passageway that extends through two opposed ones of the first through fourth backplanes.

In some embodiments, the first and second oblique angles may each be between 2 degrees and 20 degrees. In some embodiments, the third and fourth oblique angles may also each be between 2 degrees and 20 degrees.

In some embodiments, the first and second linear arrays of radiating elements may each comprise a horizontally-extending linear array of radiating elements that has at least three radiating elements.

Pursuant to further embodiments of the present invention, small cell base station antennas are provided that have a tubular housing having a strand passageway, a first linear array of radiating elements that extends from a first side of the tubular housing, and a second linear array of radiating elements that extends from a second side of the tubular housing.

In some embodiments, the strand passageway may extend through opposed sides of the tubular housing.

In some embodiments, the first side of the tubular housing may be generally opposite the second side of the tubular housing.

In some embodiments, the first side of the tubular housing may be inclined at a first oblique angle with respect to a vertically-extending plane that bisects the tubular housing when the small cell antenna is mounted for use, and the second backplane may be inclined at a second oblique angle with respect to the vertically-extending plane.

In some embodiments, the first side of the tubular housing may be inclined in a first direction and the second side of the tubular housing may be inclined in a second direction that is opposite the first direction.

In some embodiments, the tubular housing may further include a third side that is between the first side and the second side and a fourth side that is between the first side and the second side. In such embodiments, the small cell base station antenna may further include a third linear array of radiating elements that includes at least one radiating element extending forwardly from the third side of the tubular housing and a fourth linear array of radiating elements that includes at least one radiating element extending forwardly from the fourth side of the tubular housing.

In some embodiments, the third side of the tubular housing may be inclined at a third oblique angle with respect to the vertically-extending plane and the fourth side of the tubular housing may be inclined at a fourth oblique angle with respect to the vertically-extending plane.

In some embodiments, at least one of the third oblique angle and the fourth oblique angle may be greater than the first oblique angle.

In some embodiments, the housing may include first and second portions that are connected by at least one hinge.

In some embodiments, the first and second linear arrays of radiating elements may each comprise a horizontally-extending linear array of radiating elements that has at least three radiating elements.

In some embodiments, the tubular housing may have a generally truncated rectangular pyramid shape.

In some embodiments, the first and second oblique angles may each be between 2 degrees and 20 degrees.

In some embodiments, the first and second linear arrays of radiating elements may be configured to generate an antenna beam that has a generally peanut-shaped cross-section in the azimuth plane.

In some embodiments, the first and second linear arrays of radiating elements may each have more radiating elements than the third linear array of radiating elements.

In some embodiments, the small cell base station antenna may be a beamforming antenna.

In some embodiments, the small cell base station antenna may further include an orientation sensor, and the antenna may be configured to adjust a pointing direction of the antenna beams formed by the first and second linear arrays of radiating elements to account for sway of the antenna detected by the orientation sensor.

Pursuant to still further embodiments of the present invention, a network of strand-mounted small cell base station antennas is provided. The network may include a first strand that extends along a first set of poles and a second strand that extends along a second set of poles. A first small cell base station antenna may be mounted on the first strand, the first small cell antenna including a first backplane, a first linear array of radiating elements extending forwardly from the first backplane, a second backplane that is opposite the first backplane, and a second linear array of radiating elements element extending forwardly from the second backplane. A second small cell base station antenna may also be is mounted on the first strand, the second small cell base station antenna being adjacent the first small cell base station antenna, the second small cell antenna including a third backplane, a third linear array of radiating elements extending forwardly from the third backplane, a fourth backplane that is opposite the third backplane, and a fourth linear array of radiating elements extending forwardly from the fourth backplane. A third small cell base station antenna may be mounted on the second strand, the third small cell antenna including a fifth backplane, a fifth linear array of radiating elements extending forwardly from the fifth backplane, a sixth backplane that is opposite the fifth backplane, and a sixth linear array of radiating elements extending forwardly from the sixth backplane. A fourth small cell base station antenna may be mounted on the second strand adjacent the third small cell base station antenna, the fourth small cell antenna including a seventh backplane, a seventh linear array of radiating elements extending forwardly from the seventh backplane, an eighth backplane that is opposite the seventh backplane, and an eighth linear array of radiating elements extending forwardly from the eighth backplane. Each of the first through fourth small cell base station antennas is configured to generate a respective antenna beam that has a generally peanut-shaped cross-section in the azimuth plane.

In some embodiments, a boresight pointing direction of the second small cell base station antenna may point between the third small cell base station antenna and the fourth small cell base station antenna and a boresight pointing direction of the third small cell base station antenna may point between the first small cell base station antenna and the second small cell base station antenna.

DETAILED DESCRIPTION

Figure 1:
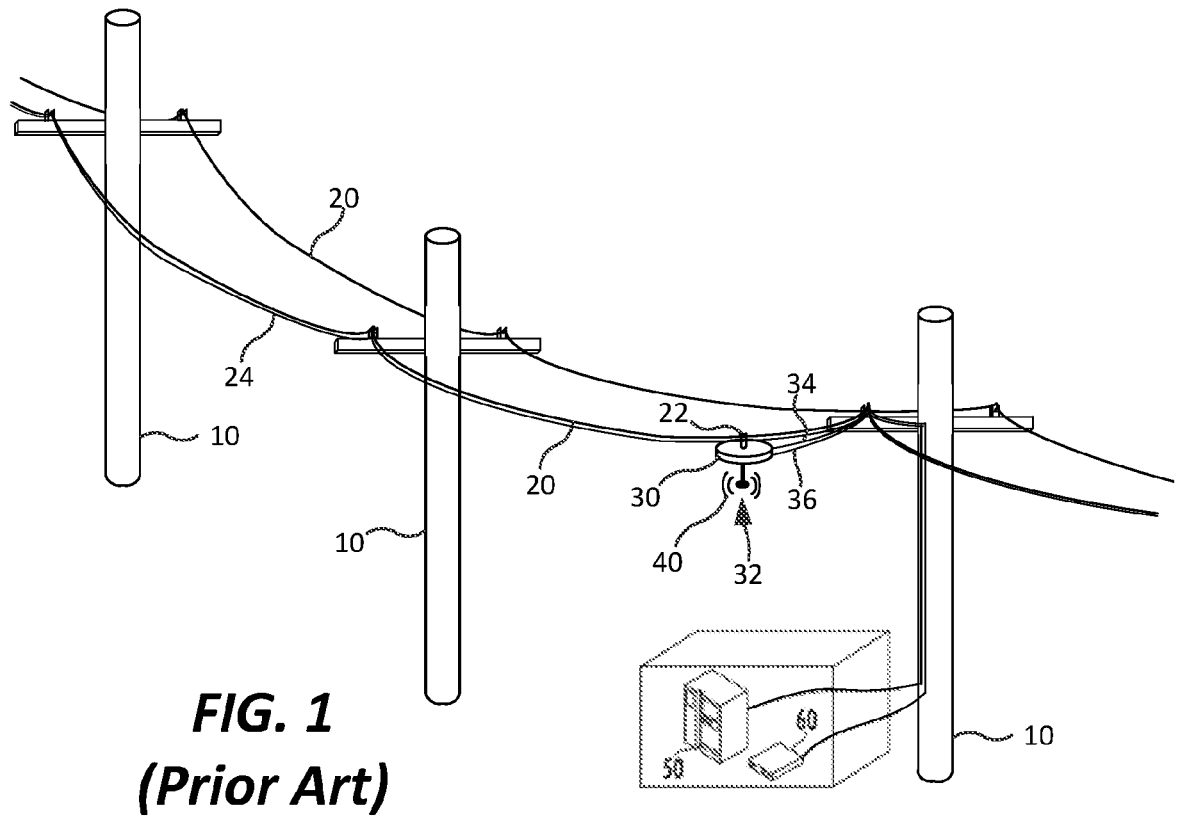
FIG. 1 is a schematic diagram illustrating a conventional strand-mounted WiFi access point.

Deploying small cell base stations can be a cost-effective way of increasing the capacity of a cellular communications network. Moreover, small cell base stations are now being designed that operate in unlicensed frequency bands that are at higher frequencies than the conventional cellular frequency bands. For example, small cell base stations are now being contemplated that operate in the 3.5 GHz and the 5.0 GHz frequency bands. Other frequency bands may also be used. Since the size of the radiating elements and various other components of a base station antenna generally decrease with increasing frequency, the small cell base station antennas that operate in these higher frequency bands may be more compact than conventional base station antennas that operate, for example, at frequencies in one or more portions of the 500 MHz to 2.7 GHz frequency range that is typically used for cellular communications.

Base station antennas are typically mounted in elevated locations to increase coverage and/or to minimize scattering of the RF signals by buildings, vegetation or terrain features. If a large number of small cell base stations are to be deployed, this requires leasing a large number of elevated mounting locations. In many cases, small cell base stations are mounted on streetlamps, electrical power poles or telecommunications cable poles. However, mounting small cell remote radio heads and antennas on such utility poles typically requires zoning approval and, in many cases, may require leasing space on the pole. Moreover, in many cases, a power connection may not be available and a hence a connection to an AC or a DC power source must be installed to power the base station equipment. As such, using utility poles as mounting locations for small cell antennas may be costly, time-consuming and/or administratively burdensome.

Cable television network operators own and operate extensive hybrid fiber/coaxial cable networks that are used to distribute cable television and broadband Internet signals to subscribers. While the fiber optic cables and coaxial cables are often buried in underground conduits, a large number of these cables are still mounted on telecommunication poles instead, particularly in urban areas and older suburban neighborhoods. High-strength wires that are referred to as "strands" are typically strung between the telecommunication poles. The telecommunication cables are hung from and supported by the strands. Typically, the telecommunications operator owns the strands, and hence may freely mount equipment on the strands. Moreover, while regulations may limit the physical size of equipment that is suspended from pole-mounted strands, as long as the equipment is within the allowed dimensions, then hanging equipment from strands often will not implicate any zoning regulations.

Some cable television network operators also now operate as mobile virtual network operators. A mobile virtual network operator refers to a cellular communications provider that primarily or exclusively leases cellular capacity from so-called mobile network operators who own and operate extensive cellular networks. The cable television network operator may configure subscriber devices to automatically connect to a WiFi network in the subscriber premise, and thus the cable television network operator can act as a mobile virtual network operator to provide "cellular" service to subscribers within their homes without any need to lease cellular resources from mobile network operators.

When the subscribers leave their homes/premises, the WiFi connection is lost and a cable television network operator that also operates as a mobile virtual network operator then would typically have to lease cellular services from a mobile network operator. To reduce such leasing costs, cable television network operators that operate as mobile virtual network operators are deploying WiFi networks which allow the cable television operator to use the WiFi networks to carry much of the cellular traffic, reducing the amount of cellular resources that they need to lease from true mobile network operators. These WiFi networks may be used, for example, to provide cellular-like coverage to shopping malls, office parks and the like. A WiFi network includes a plurality of WiFi access points which are used to provide users access to the WiFi network. A WiFi access point refers to a wireless router that operates in one or more of the WiFi frequency bands.

Pole-mounted strands have turned out to be a convenient location for cable television network operators who also operate as mobile virtual network operators to mount WiFi access points. As noted above, the cable television network operator owns the strands, and hence by strand-mounting the WiFi access points the operator may avoid the need to lease mounting locations for the WiFi access points, which can be time consuming and expensive (due to the large number of WiFi access points and the administrative burden of negotiating leases). Additionally, many strands carry coaxial cables which can carry sufficient power to operate a WiFi access point. Moreover, the strands are typically elevated about 20-30 feet above the ground, which improves the coverage provided by each WiFi access point. Finally, as noted above, if the size of the WiFi access point is within certain dimensions, then typically no zoning regulations will apply.

FIG. 1 is a schematic view of a conventional strand-mounted WiFi access point. As shown in FIG. 1, strands 20 may extend between utility poles 10. Each strand 20 may comprise, for example, a steel cable. Telecommunication cables 24 may be hung from the strand 20 via cable loops (not shown). The strand 20 may carry the weight of the telecommunication cables 24 in order to protect the telecommunication cables 24 from damage. As is further shown in FIG. 1, a WiFi access point 30 may be mounted on one of the strands 20. The WiFi access point 30 may be hung from the strand 20 by one or more brackets 22. The WiFi access point 30 may have an antenna 32 that generates an omnidirectional antenna beam 40 to provide coverage to users within range of the WiFi access point 30. A power cable 34 may be routed between a ground-based power supply 50 that may be located at the base of one of the utility poles 10 and the WiFi access point 30 to power the WiFi access point 30. In other embodiments, power may be provided to the WiFi access point 30 from a power supply (not shown) at a remote location over one of the telecommunication cables 24 (e.g., over a coaxial cable). A data cable 36 may also be provided that is connected between the WiFi access point 30 and ground-based equipment such as, for example, a router 60. The data cable 36 may pass data between the WiFi access point 30 and the router 60. The router 60 may be connected to a cellular network switching via a backhaul connection (not shown).

WiFi access points such as WiFi access point 30 of FIG. 1 may be well-suited for strand mounting as they may be small and lightweight, have low power requirements, and they may generate an omnidirectional antenna beam. However, such WiFi access points 30 also typically support only limited capacity as they have little or no antenna gain and are subject to interference from all directions. Moreover, WiFi access points 30 are not designed to perform hand-offs as users move and hence typically can only be used to support relatively stationary users. As a result, mobile virtual network operators who use networks of WiFi access points 30 may often need to lease significant amounts of cellular resources from true mobile network operators due to the limited capacity and capabilities of their WiFi networks.

Since mobile virtual network operators can always lease cellular resources from mobile network operators, mobile virtual network operators may focus on deploying their own networks in regions having the highest traffic density. This allows mobile virtual network operators to deploy resources where they will be used the most (and hence have the highest cost-effectiveness) without the need to focus on providing broad coverage. The highest usage areas are typically in urban and suburban areas. Thus, by deploying limited networks of small cell base stations in such urban and suburban high usage areas, mobile virtual network operators may be able to both overcome the limitations of traditional WiFi networks in such areas while simultaneously reducing the need to lease cellular resources from mobile network operators.

The natural location for cable television network operators who also operate as mobile virtual network operators to mount cellular base station antennas is on their "aerial plant" of pole-mounted steel strands that are used to carry fiber optic cables and coaxial cables of the cable television network. In many urban areas, a significant percentage of the cables of a cable television network are pole-mounted as, when installed, it was cheaper to string cables between existing utility poles than to bury the cables underneath existing sidewalks and streets. Moreover, while much of the cable television traffic is carried over fiber optic cables for most of the distance between a head end facility of the cable television network operator and a particular subscriber premise, nearly 80% of the strands of a typical cable television network operator that carry fiber optic cables also have coaxial cables hanging from the strands. As a result, the vast majority of strands have cables hung therefrom that are capable of supplying power to a low power cellular base station. Thus, for cable television network operators who also act as mobile virtual network operators, their aerial plant is a natural location for deployment of small cell base station antennas.

Figure 2:
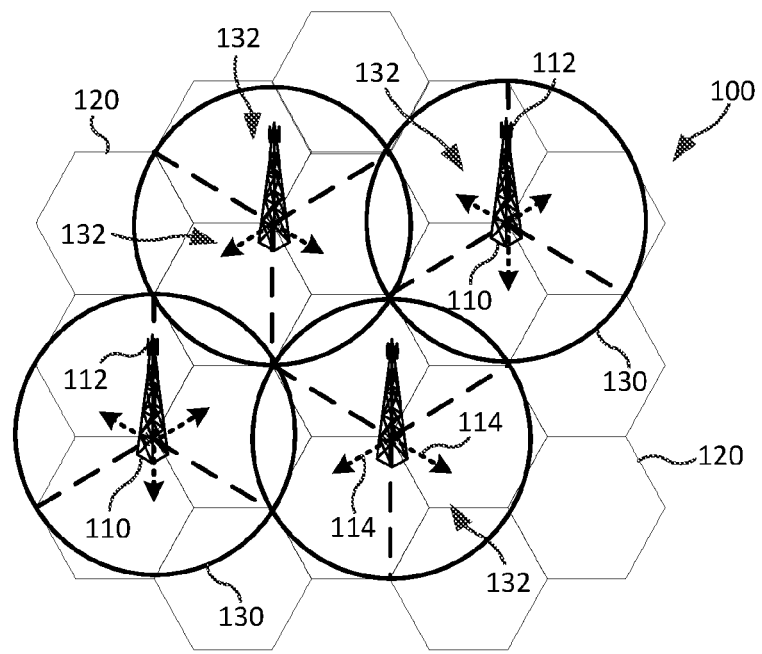
FIG. 2 is a schematic diagram illustrating a conventional macrocell cellular network.

Deploying a small cell network on aerial strands, however, is very different from deployment of traditional macrocell cellular base stations. For example, FIG. 2 is a schematic diagram illustrating a conventional macrocell cellular network 100. As shown in FIG. 2, in the conventional macrocell cellular network, a plurality of base stations 110 are deployed that provide service to generally hexagonally-shaped regions 120. In the most commonly deployed arrangement, each base station 110 includes three antennas 112 (or three sets of antennas), with each antenna 112 configured to cover a different one of three 120° "sectors" 132 in the azimuth plane. This allows each base station 110 to serve a cell 130 that encompasses approximately three of the hexagonally-shaped regions 120 as shown by the circles 130. The regions 120 typically have the hexagonal shape illustrated in FIG. 2 as this arrangement generally facilitates providing full coverage to a large region with the least amount of overlap between adjacent cells 130. As is shown in FIG. 2, the boresight pointing direction (shown by the dotted arrow 114 in FIG. 2) for each base station antenna 112 of a first base station 110 may be about halfway between two adjacent base stations 110. This may facilitate maximizing coverage while reducing interference.

Each hexagonally-shaped region 120 may be, for example, 1-5 kilometers across so that each base station 110 serves a relatively large geographic area. Each base station 110 may be configured to transmit very high power RF signals in order to ensure that the signals can be received at the edge of each cell 130 with a sufficient signal-to-noise ratio. As is also shown in FIG. 2, the base station antennas 112 are typically mounted on a tower at an elevation of, for example, 100-250 feet above the ground. This allows the antennas 112 to provide coverage throughout the cell 130 despite intervening terrain features such as hills or large buildings. Typically, the base station antennas 112 include a mechanical or electronic downtilt of, for example, 0-15° below the horizon to direct the RF signals transmitted by the base station antennas 112 within the cell 130 and to reduce interference with adjacent cells 130. The antenna pattern generated by each base station antenna 112 is most typically fixed, although it may be changed (e.g., by changing a degree of electrical downtilt in the antenna pattern) when new cells 130 are added to the network 100 or as part of an optimization of the network 100.

A small cell cellular network that is deployed using strand-mounted base station antennas necessarily may have very different characteristics as compared to a conventional macrocell cellular network. Typically, telecommunication strands are mounted at heights of about 20-30 feet above the ground. To be economically feasible, power for many of the strand-mounted small cell base stations must be delivered over relatively large distances over coaxial cables that are hanging from the strands. This may severely limit the maximum transmit power of the small cell base stations, as may maximum power restrictions to the extent that the small cell base stations transmit in unlicensed frequency bands using LTE Licensed Access Assist ("LTE-LAA"). As a result, the coverage for each small cell base station may be on the order of tens or hundreds of meters instead of on the order of kilometers.

The strands often run in relatively straight lines down the sides of respective streets, typically with buildings on either side of each strand. Since the streets often are in the form of a grid pattern, the strands may run generally in parallel to one another. Adjacent ones of the strands are also typically in relatively close proximity to each other in urban and suburban environments.

One complication that arises with strand-mounting base station antennas are that the strands are not fixed, but instead may move in response to forces such as wind. Under high wind conditions, the amount of movement may be significant, and may include both side-to-side sway of the strand in a direction that is generally perpendicular to the strand and "galloping" of the strand along the direction of the strand. Accordingly, base station antennas that are mounted on strands will also move due to wind or other forces that physically change the position and/or orientation of the base station antenna, both because of movement of the strand and because of additional wind-induced movement of the base station antenna relative to the strand. As a result, the base station antenna designs and cellular architectures that are well-suited for macrocell applications may not be all that well-suited for cellular networks that are formed using strand-mounted small cell base station antennas.

One additional consideration is that strand-mounted small cell base stations will operate within a larger macrocell cellular network of a mobile network operator. Thus, full coverage is not required for these networks, as it is always possible to lease cellular resources from the mobile network operators to cover users that are in "dead zones" of the strand-mounted cellular network. Thus, the goal of the strand-mounted cellular network may be to only provide coverage to high traffic areas while foregoing coverage of other areas.

Pursuant to embodiments of the present invention, strand-mounted small cell base station antennas are provided, as are architectures for cellular networks that are formed using such strand-mounted small cell base station antennas. Example embodiments of these strand-mounted small cell base station antennas and related cellular network architectures will now be described.

As discussed above, strand-mounted small cell base station antennas that are deployed by mobile virtual network operators may be provided to reduce the need to lease cellular resources from mobile network operators. In neighborhoods, it may, in many situations, be most desirable to provide coverage to the streets since subscribers will have coverage through their home WiFi networks when in their homes or yards. By providing coverage to the streets, the strand-mounted cellular base stations may provide connectivity to subscribers using their cell phones in their cars as they enter and leave the neighborhood or travel along major thoroughfares. In other areas, such as business districts, retail areas and the like, it may be most desirable to provide coverage to the buildings in between streets. In some cases, it may be desirable to provide coverage to both the streets and the buildings, which may require generally omnidirectional coverage in the azimuth plane. Thus, the coverage patterns that may be desirable for strand-mounted base station antenna may vary depending upon location and may also be different, in at least some cases, from the coverage patterns desired in more traditional cellular installations.

Pursuant to some embodiments of the present invention, small cell base station antennas are provided that may generate antenna patterns that are suitable for strand-mounted small cell cellular networks.

Figure 3A:
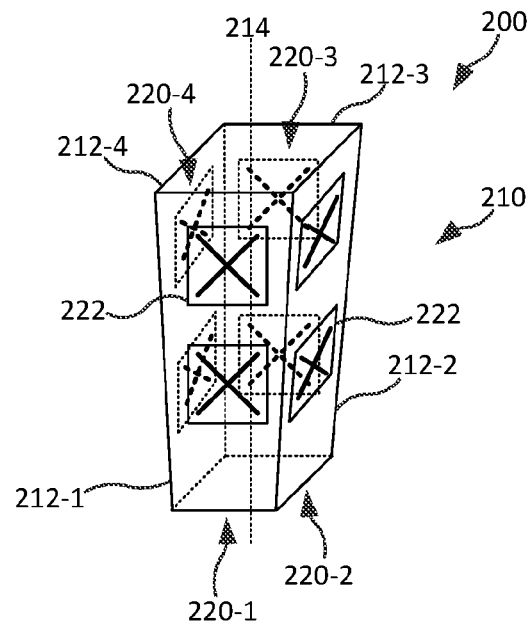
FIG. 3A is a schematic diagram of a strand-mounted small cell cellular base station antenna according to embodiments of the present invention.

FIG. 3A illustrates one strand-mounted base station antenna 200 according to embodiments of the present invention. As shown in FIG. 3A, the small cell antenna 200 may include a rectangular tubular reflector assembly 210 that has four linear arrays 220-1 through 220-4 of radiating elements 222 mounted thereon. Each face of the reflector assembly 210 may comprise a reflective backplane 212-1 through 212-4 that reflects radiation outwardly and that also serves as a ground plane for the radiating elements 222 mounted thereon. It should be noted that herein, when multiple like or similar elements are provided, they may be labelled in the drawings using a two-part reference numeral (e.g., backplane 212-2). Such elements may be referred to herein individually by their full reference numeral (e.g., backplane 212-2) and may be referred to collectively by the first part of their reference numeral (e.g., the backplanes 212).

Each linear array 220 includes multiple radiating elements 222 that are offset from each other in the vertical direction. The radiating elements 222 in each linear array 220 may not run along a true vertical axis because each backplane 212 may be inclined from the vertical to provide a mechanical downtilt to the linear arrays 220, as will be discussed in more detail below. In the depicted embodiment, each linear array 220 includes two radiating elements 222, but it will be appreciated that other numbers of radiating elements 222 may be included in the linear arrays 220 in other embodiments. Any appropriate radiating element 222 may be used including, for example, dipole, cross-dipole and/or patch radiating elements. Each of the radiating elements 222 may be identical. While not expressly shown in FIG. 3A, the radiating elements 222 may extend forwardly from their respective backplanes 212 as shown, for example, in U.S. Provisional Patent Application Ser. No. 62/593,425 ("the '425 application"), filed Dec. 1, 2017, the entire content of which is incorporated herein by reference. This will typically be the case when the radiating elements 222 are dipole (including cross-dipole) radiating elements. In the depicted embodiment, each radiating element 222 includes a pair of dipole radiators that are arranged orthogonally to each other at angles −45° and the +45° with respect to the longitudinal (vertical) axis of the antenna 200. The dipole radiators may be formed, for example, using a pair of printed circuit boards with conductive dipoles printed thereon, where the printed circuit boards are mated together so as to form an "X" shape when viewed from the front.

In one example embodiment, the radiating elements 222 may be configured to transmit and receive signals in the 3.5 GHz frequency band. In other embodiments, the radiating elements 222 may be configured to transmit and receive signals in the 5 GHz frequency band. In other embodiments, the radiating elements 222 may be configured to transmit and receive signals in some other frequency band. In still other embodiments, each radiating element 222 may include more than one pair of dipole radiators. For example, each radiating element 222 could be implemented as a pair of 3.5 GHz dipole radiators that are directly coupled to a feed network of the base station antenna 200 and a pair of 5 GHz dipole radiators that are parasitically coupled to the 3.5 GHz dipole radiators such as, for example, the 3.5/5 GHz radiating elements disclosed in the above-referenced '425 application.

Figure 3B:
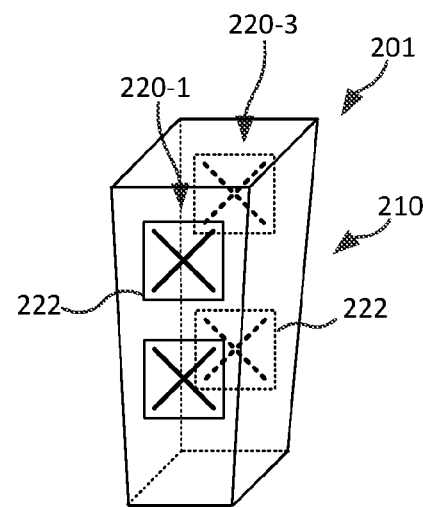
FIG. 3B is a schematic diagram of another strand-mounted small cell cellular base station antenna according to embodiments of the present invention.
Figure 3C:
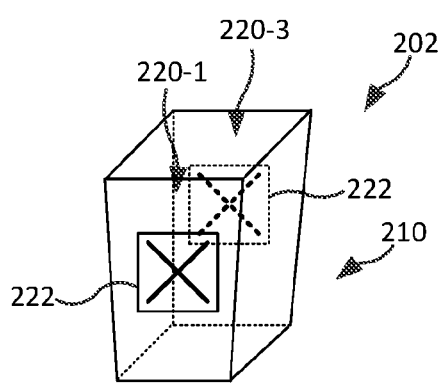
FIG. 3C is a schematic diagram of a strand-mounted small cell cellular base station antenna according to still further embodiments of the present invention.
Figure 3D:
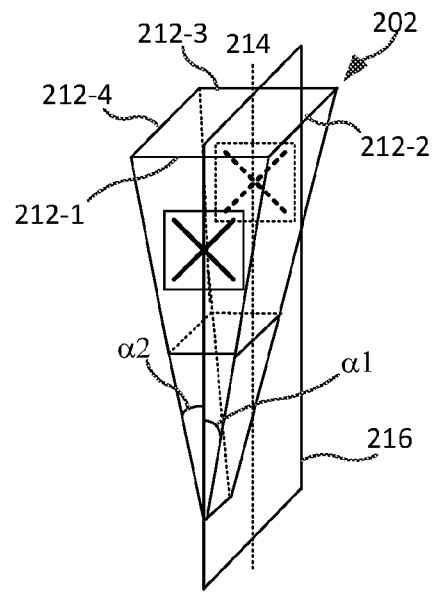
FIG. 3D is a schematic diagram illustrating the inclination angles of the first and third backplanes of the base station antennas of FIGS. 3A-3C.

As is further shown in FIGS. 3A and 3D, at least some of the reflective backplanes 212 may be angled from vertical. In particular, the tubular reflector assembly 210 may have a longitudinal axis 214 extending therethrough. Typically, when the base station antenna 200 is mounted for use, the longitudinal axis 214 will extend perpendicularly to a plane defined by the horizon. As shown in FIG. 3A, one or more of the backplanes 212 may be angled so that a bottom edge of the backplane 212 is closer to the longitudinal axis 214 than is a top edge of the backplane 212. As a result, the liner arrays that are on these backplanes may have a so-called "mechanical downtilt" so that the boresight pointing direction of the linear array (assuming no electronic tilt is applied) is below the horizon. In some embodiments, the mechanical downtilt may be between 2 and 20 degrees. The mechanical downtilt may help reduce the degree to which the base station antenna 200 interferes with neighboring cells while also providing maximum gain to locations near the edge of the cell. Because of the mechanical downtilt, the base station antenna 200 may have an upside-down, truncated rectangular pyramid shape. In some cases, such as cases where larger amounts of downtilt are uses (e.g., 30 degrees of downtilt), the base station antenna may have an upside-down pyramid shape (which may be either a rectangular or a triangular pyramid).

Additionally or alternatively, the linear arrays 220-1 through 220-4 of radiating elements 222 may include an electronic downtilt. The electronic downtilt may be a fixed downtilt or an adjustable downtilt. The electronic downtilt may be effected by applying a phase taper to the subcomponents of RF signals that are fed to the radiating elements 222 in the linear array 220. However, since in some embodiments, each linear array 220 may have a relatively small number of radiating elements (e.g., two radiating elements), the ability to electronically downtilt the antenna beam may be limited. Moreover, in cases where each linear array 220 only includes a single radiating element 222, it may not be possible to electronically downtilt the antenna beams.

As will be discussed in more detail below, the base station antenna 200 may be designed to provide a generally omnidirectional antenna pattern in the azimuth plane, while providing some amount of directivity in the elevation plane. However, as discussed above, in some cases an omnidirectional azimuth pattern may not be ideal and instead, coverage may be desired in only certain directions. FIG. 3B is a schematic diagram of a base station antenna 201 that may be suitable for such applications. Base station antenna 201 is a modified version of base station antenna 200.

As shown in FIG. 3B, the base station antenna 201 may be identical to base station antenna 200 except that linear arrays 220-2 and 220-4 are omitted. As such, the base station antenna 201 may form an antenna beam that has a generally peanut-shaped cross-section in the azimuth plane. As will be discussed below, in some applications the longitudinal axis of peanut-shaped azimuth pattern may be aligned with the strand on which the base station antenna 201 is mounted (assuming the strand runs in a generally straight line within the coverage area for the base station antenna 201). When the base station antenna 201 is mounted in this fashion, it may be used to provide coverage along the street that the strand on which the base station 201 is mounted runs. In other applications, the base station antenna 201 may be rotated ninety degrees in the azimuth plane from the above-discussed orientation so that the longitudinal axis of peanut-shaped azimuth pattern may be perpendicular to the strand on which the base station antenna 201 is mounted. In this orientation, the base station antenna 201 may primarily provide coverage to the buildings on either side of the street that the strand runs along.

FIG. 3C is a schematic diagram of a base station antenna 202 according to further embodiments of the present invention. As can be seen, the base station antenna 202 may be identical to base station antenna 201 except that each linear array 220-1, 220-3 includes a single radiating element 222. By including only a single radiating element 222 per linear array 220, the elevation beamwidth of the base station antenna 202 may be increased. As will be discussed below, this expanded elevation beamwidth may be used to counteract the negative effects that wind-induced sway may have on strand-mounted base station antenna. It will also be appreciated that a radiating element 222 may be added to backplanes 212-2 and 212-4 of base station antenna 202 to provide another embodiment that corresponds to a "one radiating element per array" version of the base station antenna 200.

The small cell base station antennas 200-202 of FIGS. 3A-3C each have a first backplane 212-1 with a first linear array of radiating elements 220-1 extending forwardly therefrom and a second backplane 212-3 with a second linear array of radiating elements 220-3 extending forwardly therefrom. The first backplane 212-1 is inclined at a first oblique angle α1 with respect to a vertical axis 214 that runs through a center of the antenna 200-202 when the antenna 200-202 is mounted for use and the second backplane 212-3 is inclined at a second oblique angle α2 with respect to the vertical axis 214, as is shown in FIG. 3D. The vertical axis 214 may, for example, lie in a vertically-extending plane 216 that bisects the housing 210. As can also be seen, for example, in FIG. 3D, the first backplane 212-1 is inclined in a first direction and the second backplane 212-3 is inclined in a second direction that is opposite the first direction. The housing 210 may further include a third backplane 212-2 and a fourth backplane 212-4 that is opposite the third backplane 212-2. The third and fourth backplanes 212-2, 212-4 may have respective linear arrays 220-2, 220-4 of radiating element 222 extending forwardly therefrom in some embodiments, as shown in FIG. 3A. The third and fourth backplanes 212-2, 212-4 may also be inclined at respective oblique angles with respect to the vertical axis 214. In some embodiments, the first oblique angle may be equal to the second oblique angle, and the third oblique angle may be equal to the fourth oblique angle. As will be discussed in more detail below, in some embodiments, the third and fourth oblique angles may be greater than the first and second oblique angles. In some embodiments, the first and second oblique angles may be between 2 degrees and 20 degrees. In some embodiments, the third and fourth oblique angles are also each between 2 degrees and 20 degrees.

Figure 4A:
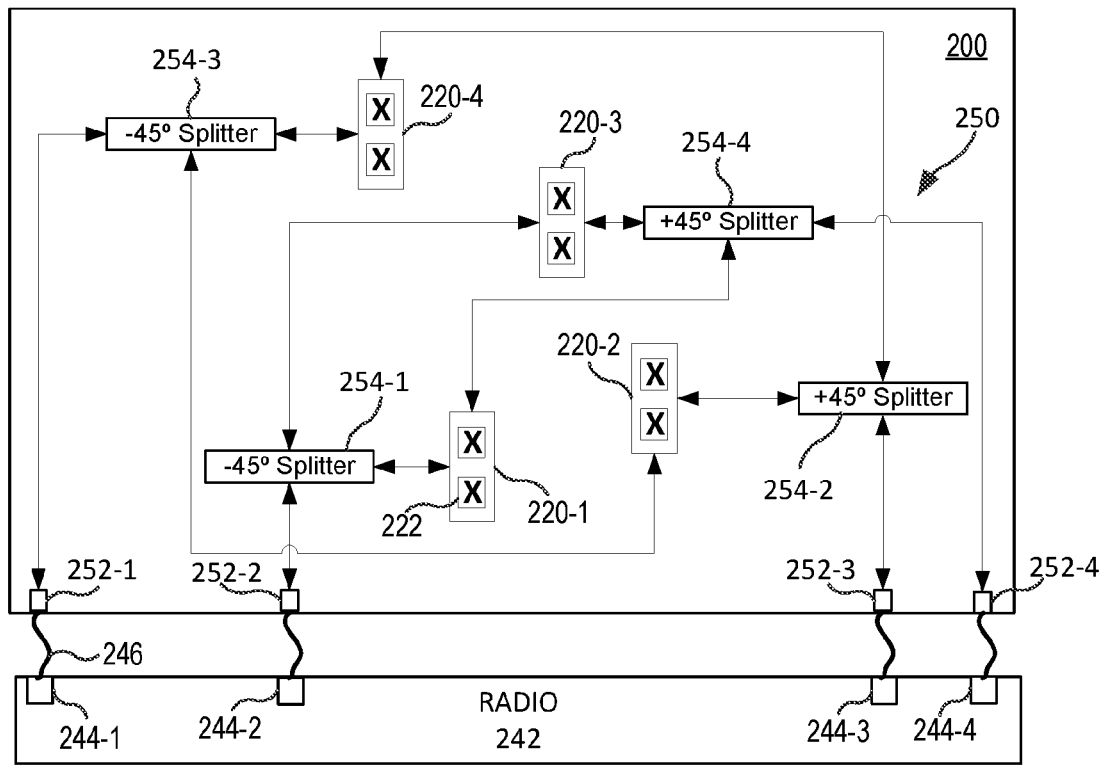
FIG. 4A is a block diagram of one example feed network for the base station antenna of FIG. 3A.

FIG. 4A is a block diagram illustrating a feed network 250 that may be included in some embodiments of the base station antenna 200 of FIG. 3A. As shown in FIG. 4A, in an example embodiment, the antenna 200 may be fed by a radio 242 that has four ports 244-1 through 244-4. Duplexing of the transmit and receive channels is performed internal to the radio 242, so each port 244 on the radio 242 passes both transmitted and received RF signals. In such an embodiment, the base station antenna 200 may include four ports 252-1 through 252-4. Each port 244 on the radio 242 may be connected to a respective one of the ports 252 on the antenna 200 via a coaxial cable 246.

As discussed above, each radiating element 222 may include a pair of dipole radiators that are arranged orthogonally to each other at angles of −45° and +45° with respect to the longitudinal (vertical) axis of the antenna 200. The provision of four ports 244 on radio 242 allows the radio 242 to feed signals to two different subsets of the linear arrays 220 of base station antenna 200 at two different (orthogonal) polarizations. Since the base station antenna 200 has slant −45°/+45° cross-dipole radiating elements 222, the two polarizations will be referred to as the −45° and the +45° polarizations.

As shown in FIG. 4A, the second port 244-2 of radio 242 is coupled to the −45° polarization radiators of the radiating elements 222 of linear arrays 220-1, 220-3 via a first 1×2 power splitter/combiner 254-1. Similarly, the third port 244-3 of radio 242 is coupled to the +45° polarization radiators of the radiating elements 222 of linear arrays 220-1, 220-3 via a second 1×2 power splitter/combiner 254-2. The first port 244-1 of radio 242 is coupled to the −45° polarization radiators of the radiating elements 222 of linear arrays 220-2, 220-4 via a third 1×2 power splitter/combiner 254-3. Similarly, the fourth port 244-4 of radio 242 is coupled to the +45° polarization radiators of the radiating elements 222 of linear arrays 220-2, 220-4 via a fourth 1×2 power splitter/combiner 254-4. As noted above, in some embodiments, a phase taper may be applied to the signals fed to the two radiating elements 222 of each linear array 220 in order to effect an electronic downtilt to the antenna pattern.

When the base station antenna 200 is fed in the manner discussed above with reference to FIG. 4A, the antenna 200 may generate two distinct antenna patterns at each of two polarizations for a total of four antenna beams. In particular, a first −45° polarization antenna beam is generated by linear arrays 220-1 and 220-3 and a second −45° polarization antenna beam is generated by linear arrays 220-2 and 220-4. Likewise, a first +45° polarization antenna beam is generated by linear arrays 220-1 and 220-3 and a second +45° polarization antenna beam is generated by linear arrays 220-2 and 220-4. Based on the pointing direction of the linear arrays 220, each of the four antenna beams may have a generally peanut-shaped cross-section in the azimuth plane, since each antenna beam is generated by linear arrays 220 that point in opposite directions in the azimuth plane. The antenna beams at each polarization are offset by 90 degrees with respect to each other in the azimuth plane. Together, the two antenna beams (at each polarization) may provide generally omnidirectional coverage in the azimuth plane.

Figure 4B:
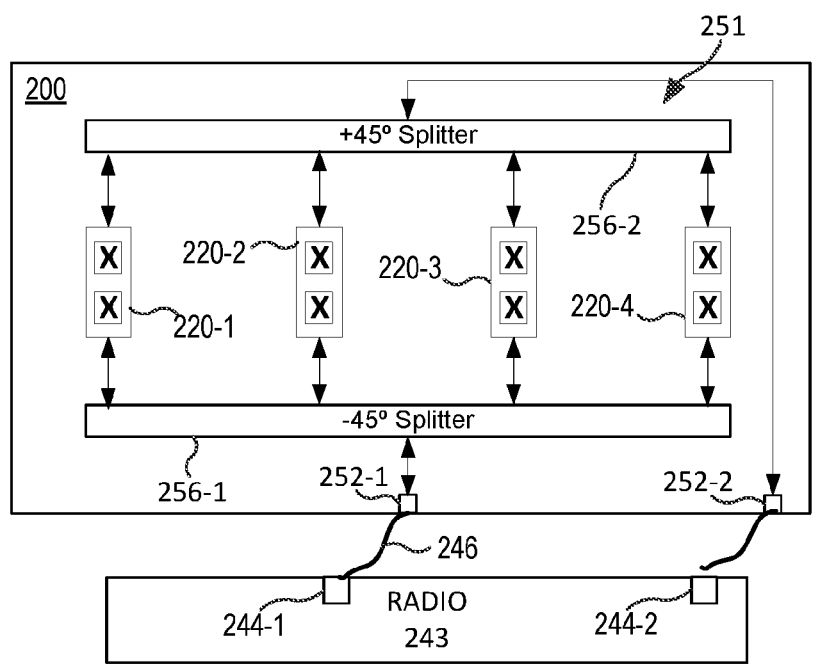
FIG. 4B is a block diagram of another example feed network for the base station antenna of FIG. 3A.

In other embodiments, the linear arrays 220 may be fed by a two-port radio 243. In particular, as shown in FIG. 4B, in another embodiment, the antenna 201 may be fed by a radio 243 that has two ports 244-1 and 244-2. Duplexing of the transmit and receive channels is performed internal to the radio 243, so each port 244 on the radio 243 passes both transmitted and received RF signals. In such an embodiment, the antenna 201 may include two ports 252-1 and 252-2. Each port 244 on the radio 243 may be connected to a respective one of the ports 252 on the antenna 201 via a respective coaxial cable 246. A passive feed network 251 may connect the radiating elements 222 to antenna ports 252-1 and 252-2.

Each port 244 of radio 242 is coupled to all four linear arrays 220-1 through 220-4. One port 244-1 delivers signals having a −45° polarization to the linear arrays 220 while the other port 244-2 delivers signals having a +45° polarization to the linear arrays 220. In each case, the four linear arrays 220 may together transmit a quasi-omnidirectional antenna pattern in the azimuth plane. The feed network includes a pair of 4×1 splitter/combiners 256-1 and 256-2 that split the signals four ways to feed the four linear arrays 220. In some embodiments, the sub-components of each split signal may be fed to the radiating elements 222 of each linear array 220 with the same phase delay, while in other embodiments a phase taper may be applied to the signals fed to the two radiating elements 222 of each linear array 220 in order to effect electronic downtilts to the elevation pattern of the antenna beam.

It will be appreciated that the feed network 250 may be modified for use with the base station antennas 201 or 202 by omitting ports 252-2, 252-4 and splitter/combiners 254-1 and 254-4, and that feed network 251 may be modified for use with the base station antennas 201 or 202 by replacing the 4×1 splitter/combiners 256-1 and 256-2 with 2×1 splitter combiners.

Figure 5A:
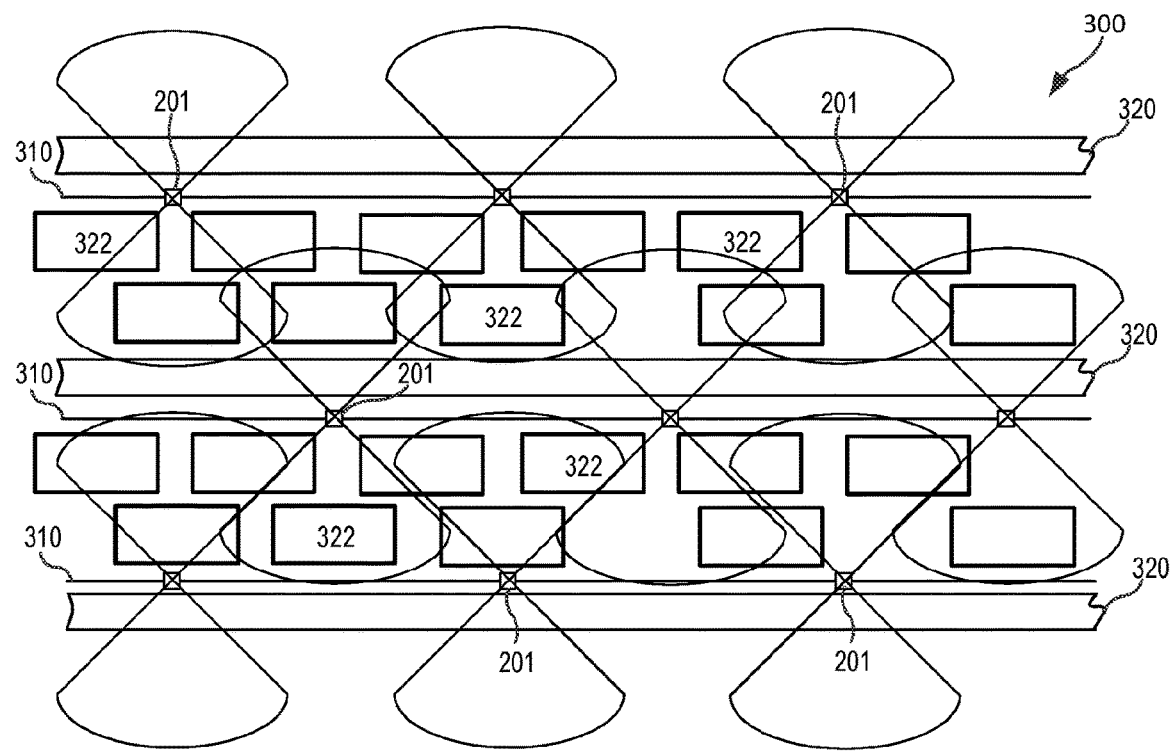
FIGS. 5A-5C are schematic plan views of several architectures for strand-mounted small cell cellular networks.
Figure 5B:
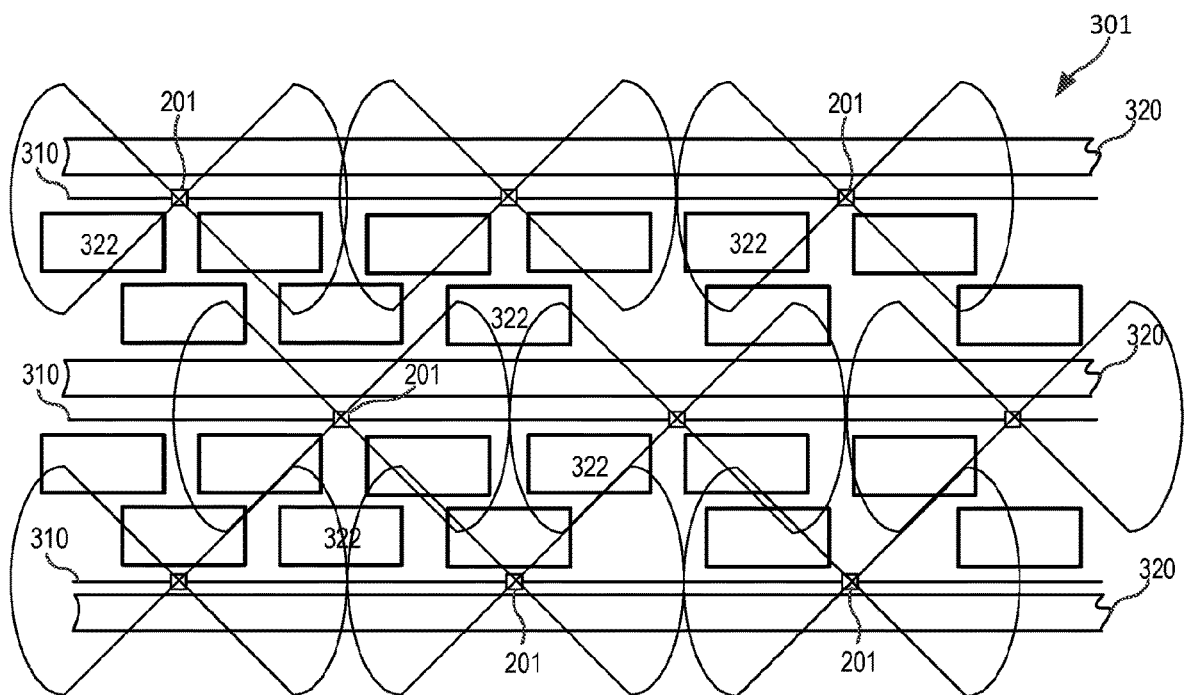
Figure 5C:
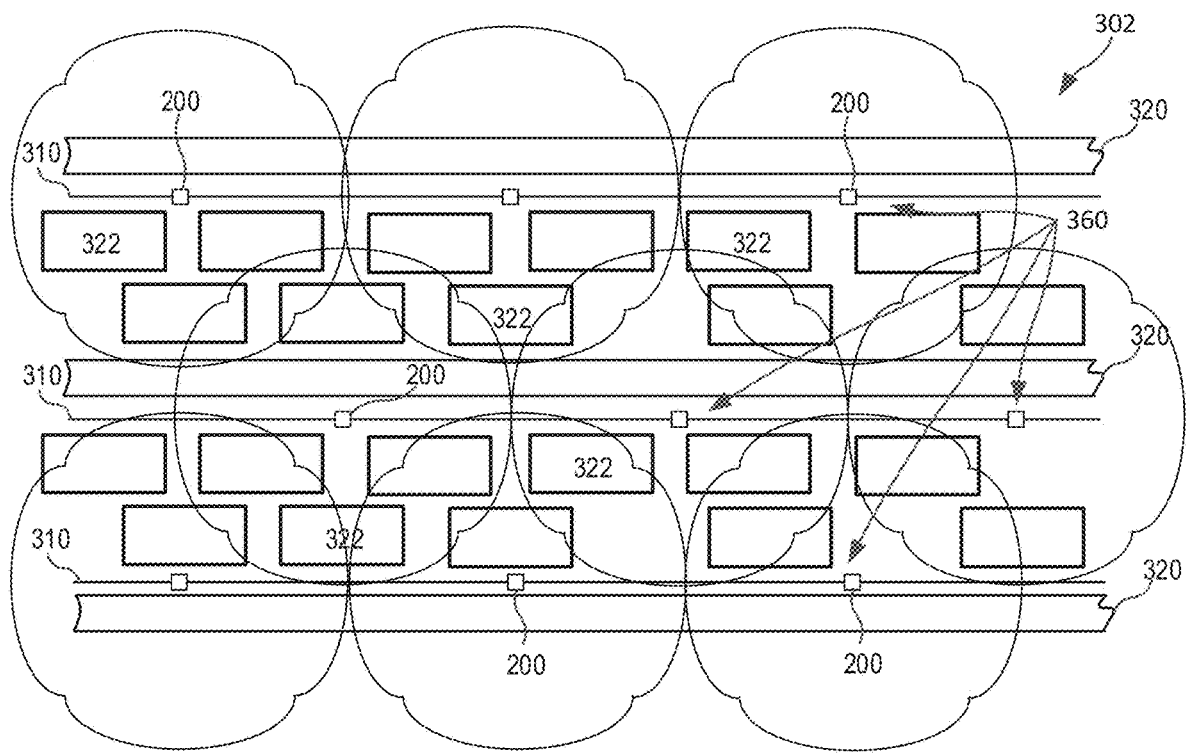

FIGS. 5A-5C are schematic plan views of several architectures for strand-mounted small cell cellular networks. The base station antenna 201 of FIG. 3B or the base station antenna 202 of FIG. 3C may be used to implement the base station antennas shown in FIGS. 5A-5B, while the base station antenna 200 of FIG. 3A may be used to implement the base station antennas shown in FIG. 5C.

Referring first to FIG. 5A, a network 300 of strand-mounted small cell base station antennas is illustrated. As shown in FIG. 5A, the network 300 is implemented on strands 310 that extend down generally parallel streets 320. Buildings 322 are positioned in the area between the two streets 320. While FIG. 5A depicts the strands 310 extending down adjacent streets 320, it will be appreciated that in other cases one or more additional streets 320 (and associated buildings 322) may be provided between the streets 320 having the strands 310.

As shown in FIG. 5A, the base station antennas 201 may be strand-mounted at an orientation where the linear arrays 220 thereof point toward the buildings 322. Antenna beams having generally peanut-shaped cross-sections in the azimuth plane may be generated by the linear arrays 220 to provide coverage into buildings 322 on either side of each strand 310. The base station antenna 201 on adjacent strands 310 may be offset from each other along the direction in which the strands 310 extend so that the boresight pointing direction of the antenna beams on each base station antenna 201 point to locations between the base station antenna 201 on adjacent strands 310.

As shown in FIG. 5B, in another architecture, a network 301 of strand-mounted small cell base station antennas is provided in which each of the base station antenna 201 is rotated approximately ninety degrees from the orientation shown in FIG. 5A. The effect of this change is that the antenna beams now provide coverage up and down the streets 320.

As shown in FIG. 5C, in another architecture, a network 360 of strand-mounted small cell base station antennas using the base station antennas 200. As shown in FIG. 5C, the network 302 is again implemented on strands 310 that extend down generally parallel streets 320. The base station antennas 200 in the depicted embodiment are formed using the feed network 251 of FIG. 4B so that each base station antenna 200 forms a generally omnidirectional antenna pattern in the azimuth plane, as shown. Consequently, the antenna patterns provide coverage to both the streets 320 and to the buildings 322, as is schematically illustrated in FIG. 5C.

In each of the above networks, the base station antenna 200, 201, 202 may have directional antenna beams in the elevation plane. The use of directional antenna beams may reduce interference with neighboring cells and allow both the base station radios and the subscriber devices to transmit signals at lower power settings, reducing power consumption.

Figure 6:
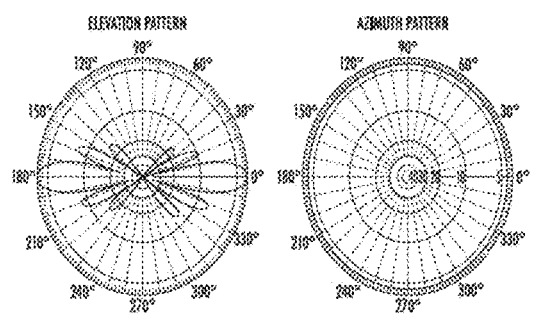
FIG. 6 is a schematic diagram illustrating an antenna beam of a conventional small cell antenna, and also includes graphs of the corresponding azimuth and elevation patterns of the antenna beam.

Strands provide a convenient, low-cost location for mounting antennas and remote radio heads for small cell base stations, particularly as the size of such equipment decreases. However, as noted above, one potential problem with strand-mounting small cell base station antennas is that the strand and/or base station equipment that is mounted thereon can sway in response to wind. If the small cell antenna has an omnidirectional antenna pattern in both the azimuth and elevation planes, then such sway may not materially impact the coverage of the small cell antenna. However, in order to increase capacity and/or to reduce interference with neighboring cells, small cell antennas are now being developed that have directional antenna patterns. For example, a small cell antenna may be designed to have an omnidirectional antenna pattern in the azimuth plane, but a directional antenna pattern in the elevation plane that concentrates the RF energy at a range of elevation angles that are, for example, within about 10°-15° of the horizon. FIG. 6 graphically depicts such an antenna pattern, which as shown may have a generally toroidal shape. FIG. 6 also includes graphs of the azimuth and elevation patterns for the illustrated antenna beam that show how the antenna beam provides 360 degree coverage in the azimuth plane while being directional in the elevation plane. Such an antenna pattern may provide increased antenna gain to locations within the small cell, particularly at the edges thereof, while limiting the amount of radiation emitted upwardly or into the ground near the base of the antenna mounting location. The azimuth pattern is generated by taking a horizontal cross-section through the middle of the three-dimensional antenna pattern, and the elevation pattern is generated by taking a vertical cross-section through the middle of the three-dimensional antenna pattern.

Figure 7A:
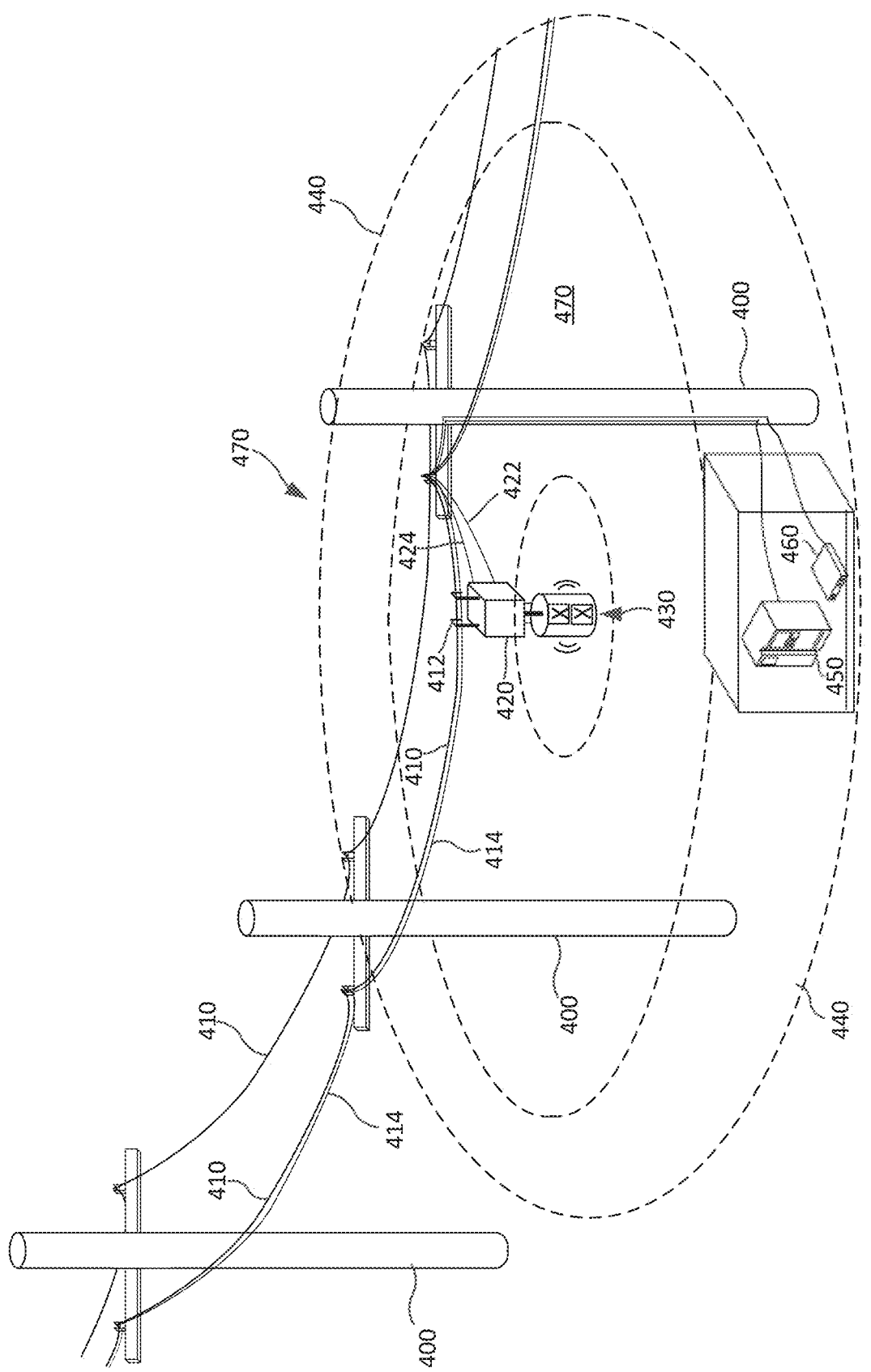
FIGS. 7A-7B are schematic diagrams illustrating how the performance of a strand-mounted small cell cellular base station may be degraded as a result of wind.

FIG. 7A is a schematic diagram illustrating a small cell base station having a strand-mounted base station antenna. As shown in FIG. 7A, a remote radio head 420 is mounted on a strand 410 that is supported between two utility poles 400. The remote radio head 420 may be hung from the strand 410 by one or more brackets 412. Telecommunication cables 414 may also be hung from the strand 410. The remote radio head 420 may be powered by a power cable 422. The power cable 422 may be supported by the strand 410 and may run down one of the poles 400 where it may be connected to a power supply 450. A data cable 424, which may be, for example, a fiber optic cable, may also be hung from the strand 410 and routed down one of the poles 400 where it is connected to ground-based baseband equipment 460. A small cell antenna 430 is mounted to hang below the remote radio head 420. The small cell antenna 430 may be mounted vertically so that its longitudinal axis and/or the axes defined by the linear arrays of radiating elements included in the small cell antenna 430 are generally perpendicular to the plane defined by the horizon.

As is further shown in FIG. 7A, the small cell antenna 430 generates an antenna beam 440. In FIG. 7A, it is assumed that the small cell antenna generates a generally toroidal antenna beam 440 (shown schematically in FIG. 7A using dashed lines) that provides full 360° coverage in the azimuth plane. The shape of the antenna beam 440 may be, for example, similar to the shape of the antenna beam shown in FIG. 6. The small cell antenna 430 may be designed so that the antenna beam 440 has a small electrical and/or mechanical downward tilt in the elevation plane so that the peak magnitude of the antenna beam is pointed at an elevation angle of less than 0 degrees (e.g., an elevation angle of between −1 degree and −15 degrees). When the "downtilt" is applied electrically (by applying a phase taper to the sub-components of an RF signal that are fed to the radiating elements of each vertical array included in small cell antenna 430), the antenna beam 440 may have a slight conical shape so that the antenna beam 440 tends to point into the ground at or near an edge of the region (i.e., the cell 470) covered by the small cell base station. Such a downtilt may facilitate providing high antenna gain for communicating with users near the edge of the cell 470 while reducing the amount of radiation that leaks into neighboring cells.

In FIG. 7A, the small cell antenna 430 and the antenna beam 440 that it produces are shown assuming that the strand 410 is not swaying. As show in FIG. 7A, when the small cell antenna 430 is not affected by sway, the antenna beam 440 having the above-described toroidal pattern extends outwardly generally parallel to the plane defined by the horizon, with the slight downwardly-extending conical shape causing the antenna beam 440 to terminate into the ground at or near the edges of the cell 470. Thus, under these conditions, the antenna beam 440 will tend to provide coverage to the edge of the cell 470 while not emitting significant radiation into neighboring cells.

Unfortunately, pole-mounted strands such as strand 410 may sway, particularly on windy days. The sway may be a side-to-side sway or an up-down sway that is typically referred to as "galloping." When base station equipment such as remote radio heads 420 and/or antennas 430 are mounted on a strand 410, the large surface area of these devices may absorb higher amounts of wind force, and hence increase the amount of sway. This may particularly be true if the strand-mounted equipment 420, 430 is mounted to the strand 410 via brackets 412 so that the equipment 420, 430 hangs below the strand 410. When the equipment 420, 430 is mounted in this configuration, the equipment 420, 430 may sway on the strand 410, and hence the sway experienced by the equipment 420, 430 will be the combination of the sway of the strand 410 and the sway of the equipment 420, 430 on the strand 410. This sway may negatively impact the performance of a small cell base station.

Figure 7B:
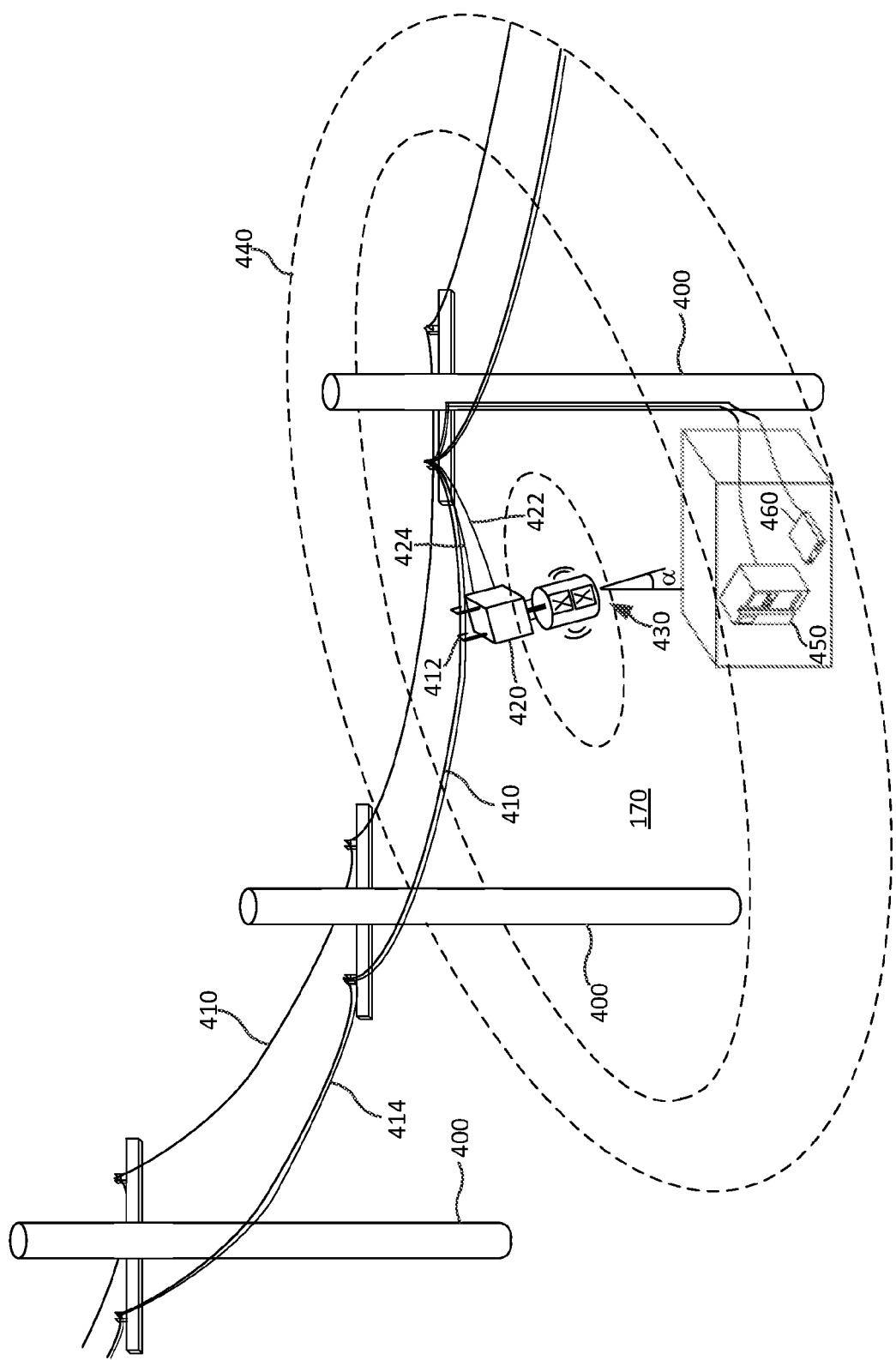

FIG. 7B is a schematic diagram illustrating how sway may negatively impact the coverage of a strand-mounted small cell antenna 430. As shown in FIG. 7B, when the strand 410 and/or the remote radio head 420 sways, the small cell antenna 430 will also sway and consequently the longitudinal axis of the small cell antenna 430 will no longer be perpendicular to the plane defined by the horizon, but instead will be tilted at an angle α from an axis that is perpendicular to the plane defined by the horizon. This sway-induced tilt results in a corresponding tilt to the orientation of the antenna beam 440. As shown in FIG. 7B, this tilt causes one side of the antenna beam 440 (the left side in FIG. 7B) to point downwardly, which results in the peak radiation of the antenna beam 440 pointing into the ground in the interior of the cell 470, which degrades coverage at the edge of the portion of the cell that is on the left side of the small cell antenna 430. The tilt causes the other side of the antenna beam 440 (the right side in FIG. 7B) to point upwardly, which results in the peak radiation of the antenna beam 440 pointing into the sky. This may severely degrade coverage on the left side of the cell 470, and may result in interference in neighboring cells 470. Thus, FIG. 7B shows how sway may be problematic for strand-mounted small cell antennas having directional radiation patterns.

In some embodiments, the base station antenna 200, 201 of FIGS. 3A-3B may be designed to have relatively broad antenna patterns in the elevation plane. Thus, instead of having a 3 dB beamwidth on the order of 15-25 degrees in the elevation plane the base station antenna may be designed to have a 3 dB beamwidth on the order of 25-60 degrees in the elevation plane. By expanding the elevation beamwidth, even if the antenna is subject to sway, the increased elevation beamwidth may provide sufficient antenna gain at cell edge to provide coverage to users within the cell. One way of increasing the elevation beamwidth may be to reduce the number of radiating elements in each linear array 220. The base station antenna 202 of FIG. 3C takes this approach, using single element linear arrays 220. Each radiating element 222 may have a 3 dB beamwidth in the elevation plane of, for example, about 60 degrees in some embodiments, as compared to elevation 3 dB beamwidths of, for example, between 30-40 degrees when the linear arrays 220 include two radiating elements 222 each.

Additionally, RF lenses may be used in some embodiments to defocus the radiation emitted by the radiating elements, thereby expanding the elevation beamwidth. Convex RF lenses may be used to accomplish such spreading of the elevation beamwidth. Individual RF lenses may be provided that are positioned in front of each radiating element 222 in some embodiments. The above-referenced '425 application discloses RF lenses that are used to defocus radiation in the azimuth plane. Similar RF lenses could be rotated 90 degrees and employed to defocus the RF radiation in the elevation plane, although the lenses would not require the asymmetry discussed in the '425 application that is used to redirect some of the upwardly directed radiation downwardly in the particular application discussed in the '425 application.

Moreover, various techniques may be used to reduce sway, including, for example, any of the techniques disclosed in U.S. Provisional Patent Application Ser. No. 62/597,045, filed Dec. 11, 2017, the entire content of which is incorporated herein by reference. It will be appreciated that any of these techniques (including multiple of the techniques) may be employed with the base station antenna according to embodiments of the present invention.

Figure 8A:
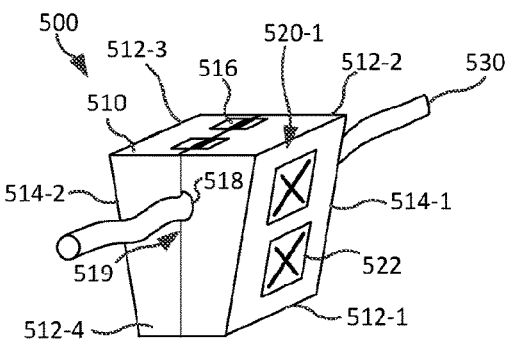
FIGS. 8A and 8B are schematic perspective views of strand-mountable base station antennas according to further embodiments of the present invention.
Figure 8B:
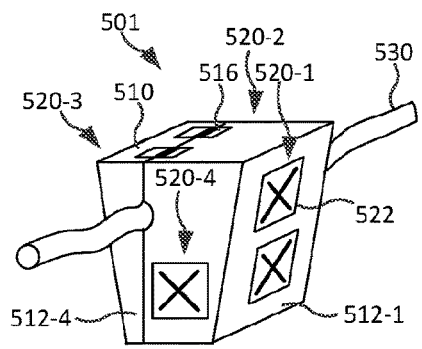

Pursuant to further embodiments of the present invention, base station antenna are provided that may be directly mounted on a strand. FIGS. 8A and 8B illustrate two such base station antenna 500, 501. It will be appreciated that the description of the base station antenna 200-202 of FIGS. 3A-3C applies equally to the base station antenna 500, 501 except for the difference described below.

Referring first to FIG. 8A, a base station antenna 500 is depicted that is similar to the base station antenna 201 of FIG. 3B. The base station antenna 500 includes a rectangular tubular reflector assembly 510 that has a an upside-down truncated rectangular pyramid shape. The reflector assembly thus has four side faces 512-1 through 512-4. First and second linear arrays 520-1 and 520-3 of radiating elements 522 are mounted on opposed side faces 512-1 and 512-3 (only linear array 520-1 is visible in FIG. 8A, but linear array 520-3 may be identical thereto except that it is mounted on a different backplane 512) each of which may comprise a reflective backplane that reflects radiation outwardly and that also serves as a ground plane for the radiating elements 522 mounted thereon. The radiating elements 522 may extend forwardly from the respective backplanes 512 and may be implemented in the manner of the radiating elements 222 that are discussed above.

As is shown in FIG. 8A, the reflective backplanes 512 are angled from the vertical so that each linear array 520 is mechanically downtilted to point below the horizon. Additionally, the tubular reflector assembly 510 may be a hinged unit that has first and second opposed portions 514-1, 514-2 that are connected at the top of the tubular reflector assembly 510 by hinges 516. Sides 512-2, 512-4 of reflector assembly 510 each include an opening 518 that is sized to receive a strand 530. A strand passageway 519 extends between the openings 518. A grommet or other weatherproofing element may be provided around the periphery of each opening 518. The base station antenna 500 may be opened and then closed around a strand 530 so that the base station antenna 500 is mounted directly on the strand 530 with the strand 530 within the strand passageway 519. Clamps or other mechanisms may be provided along the strand passageway (not visible in FIG. 8A) that maintain the base station antenna 500 in a desired orientation on the strand 530. Mounting the base station antenna 500 directly on the strand 530 may reduce the amount of sway as compared to an equivalently sized base station antenna that is hung below the strand 530.

As shown in FIG. 8B, in another embodiment, a base station antenna 501 is provided that is identical to base station antenna 500, except that base station antenna 501 further includes linear arrays 520-2 and 520-4 on backplanes 512-2 and 512-4, respectively. In some embodiments, linear arrays 520-2 and 520-4 may each only include a single radiating element 522. This may provide room for the strand 530 to pass through the tubular reflector assembly 510.

As discussed above with reference to FIG. 5A, when base station antennas are mounted on first and second adjacent strands, the directional antenna beam (in the azimuth plane) generated by the base station antenna that is mounted on the first strand may point between the two closest base station antenna that are mounted on the second strand. This may reduce interference between neighboring cells. However, since only a single strand will typically run down a street, such an approach may not be available when the base station antennas are configured to provide coverage to the streets as shown in the example architecture of FIG. 5B. As a result, interference issues may tend to arise between adjacent base station antenna that are mounted on the same strand.

By only providing a single radiating element 522 in linear arrays 512-2, 512-4 of base station antenna 501, the base station antenna 501 may be used in the architecture shown in FIG. 5C with backplanes linear arrays 520-2, 520-4 oriented to form an antenna beam having a generally peanut-shaped cross-section in the azimuth plane that provides coverage to the streets 320. Additionally, backplanes 512-2 and 512-4 may be slanted from the vertical more than backplanes 512-1 and 512-3, so that linear arrays 520-2 and 520-4 have a greater mechanical downtilt than do linear arrays 520-1 and 520-3. This increased downtilt may be used to reduce interference between adjacent base station antenna 501 that are mounted on the same strand 530. Either of the above-described techniques for reducing interference between base station antenna that are mounted on the same strand may be used on any of the base station antennas disclosed herein to provide additional embodiments of the present invention.

Pursuant to yet additional embodiments of the present invention, strand-mounted beam-steering small cell base station antennas are provided. The use of beam-steering may provide significantly enhanced antenna gain, allowing the base station antenna to be mounted further apart. In some embodiments, the beam-steering capabilities may also be used to counter the negative effects of sway.

Figure 9A:
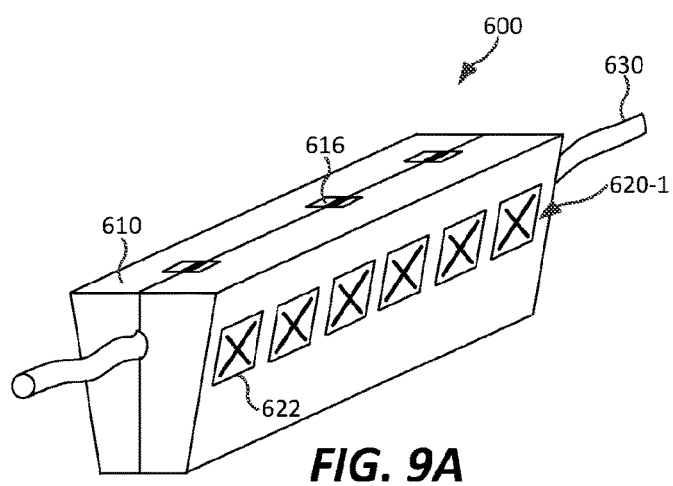
FIGS. 9A and 9B are schematic perspective views of strand-mountable base station antennas according to still further embodiments of the present invention.

FIG. 9A is a schematic perspective view of a strand-mountable beam-steering small cell base station antenna 600. The small cell base station antenna 600 may be similar to the small cell base station antenna 500, except that instead of having two downtilted vertical linear arrays 520 of radiating elements, the base station antenna 600 includes a pair of horizontally-extending linear arrays 620 that each have six radiating elements 622. The individual radiating elements 622 may be mechanically downtilted, as shown, in some embodiments. The provision of six radiating elements 622 per horizontal array 620 allows the base station antenna 600 to electronically steer the generated antenna beams in the azimuth plane. The antenna beams may be steered, for example, on a time-slot-by-time-slot basis of a time division duplex system so that each antenna beam points at a particular user during each time slot.

The base station antenna 600 may be implemented as an active antenna in some embodiments where each radiating element 622 has, for example, independent phase control allowing the electronic steering of the antenna beam. In other embodiments, the base station antenna may perform holographic beam forming where COTS varactors are used to modulate a hologram on the antenna surface to perform dynamic beamforming.

Figure 9B:
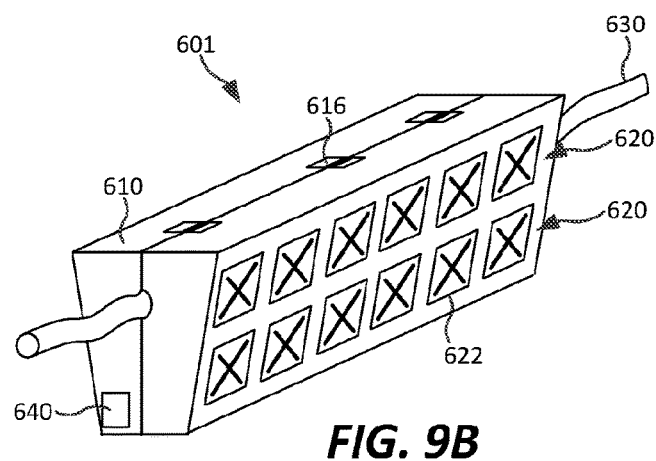

FIG. 9B shows another base station antenna 601 according to embodiments of the present invention that is similar to the base station antenna 600, except that base station antenna 600 includes two horizontal linear arrays 520 on each of backplanes 512-1 and 512-3, so that each backplane has a planar array of radiating elements 622 having two rows 620 of radiating elements with six radiating elements 622 each. Since the planar arrays have two radiating elements 622 per column, beam-steering may also be performed in the elevation plane. The beam-steering may be used to compensate for the effects of sway. The base station antenna may determine the amount of sway present, for example, using an orientation sensor 640 such as, for example, a three-axis accelerometer, a gyroscope or the like. The base station antenna 601 may be configured to adjust a pointing direction of the antenna beams formed by the first and second linear arrays 620 of radiating elements 622 to account for sway of the antenna 601 detected by the orientation sensor 640.

It will be appreciated that the description of the base station antennas 200-202 and 500-501 of FIGS. 3A-3C and 8A-8B applies equally to the base station antenna 600, 601 except for the difference described above.

The present invention has been described above with reference to the accompanying drawings. The invention is not limited to the illustrated embodiments; rather, these embodiments are intended to fully and completely disclose the invention to those skilled in this art. In the drawings, like numbers refer to like elements throughout. Thicknesses and dimensions of some elements may not be to scale.

Spatially relative terms, such as "under", "below", "lower", "over", "upper", "top", "bottom" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity. As used herein the expression "and/or" includes any and all combinations of one or more of the associated listed items.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

That which is claimed is:

1. A small cell base station antenna that has a vertical axis running through a center thereof when the small cell base station is mounted for use, comprising:
   a first backplane;
   a first linear array of radiating elements that includes at least one radiating element extending forwardly from the first backplane;
   a second backplane that is opposite the first backplane;
   a second linear array of radiating elements that includes at least one radiating element extending forwardly from the second backplane;
   a third backplane that is between the first backplane and the second backplane;
   a fourth backplane that is opposite the third backplane; and
   a strand passageway that extends through the third and fourth backplanes,
   wherein the first backplane is inclined at a first oblique angle with respect to the vertical axis and the second backplane is inclined at a second oblique angle with respect to the vertical axis.

2. The small cell base station antenna of claim 1, wherein the first backplane is inclined in a first direction and the second backplane is inclined in a second direction that is opposite the first direction.

3. The small cell base station antenna of claim 2, further comprising:
   a third linear array of radiating elements that includes at least one radiating element extending forwardly from the third backplane;
   a fourth linear array of radiating elements that includes at least one radiating element extending forwardly from the fourth backplane.

4. The small cell base station antenna of claim 3, wherein the third backplane is inclined at a third oblique angle with respect to the vertical axis and the fourth backplane is inclined at a fourth oblique angle with respect to the vertical axis.

5. The small cell base station antenna of claim 1, wherein a 3 dB beamwidth of the first linear array of radiating elements in an elevation plane is between about 25 degrees and about 60 degrees.

6. The small cell base station antenna of claim 1, wherein the small cell base station antenna is configured to be hung directly or indirectly from a pole-mounted strand.

7. The small cell base station antenna of claim 1, wherein the first and second oblique angles are each between 2 degrees and 20 degrees.

8. The small cell base station antenna of claim 1, wherein the first and second linear arrays of radiating elements each comprise a horizontally-extending linear array of radiating elements that has at least three radiating elements.

9. A small cell base station antenna, comprising:
   a tubular reflector assembly that has a first side face, a second side face, a third side face and a fourth side face, the first side face being opposite the fourth side face and the second side face being opposite the third side face;
   a strand passageway that extends through the first and fourth side faces of the tubular reflector assembly;
   a first linear array of radiating elements that extends from the second side face of the tubular reflector assembly; and
   a second linear array of radiating elements that extends from the third side face of the tubular reflector assembly.

10. The small cell base station antenna of claim 9, wherein the second side face of the tubular reflector assembly is inclined at a first oblique angle with respect to a vertically-extending plane that bisects the tubular reflector assembly when the small cell base station antenna is mounted for use, and the third side face of the tubular reflector assembly is inclined at a second oblique angle with respect to the vertically-extending plane.

11. The small cell base station antenna of claim 10, wherein the second side face of the tubular reflector assembly is inclined in a first direction and the third side face of the tubular reflector assembly is inclined in a second direction that is opposite the first direction.

12. The small cell base station antenna of claim 9, further comprising:
   a third linear array of radiating elements that includes at least one radiating element extending forwardly from the first side face of the tubular reflector assembly; and a fourth linear array of radiating elements that includes at least one radiating element extending forwardly from the fourth side face of the tubular reflector assembly.

13. The small cell base station antenna of claim 12, wherein the third first side face of the tubular reflector assembly is inclined at a third oblique angle with respect to the vertically-extending plane and the fourth side face of the tubular reflector assembly is inclined at a fourth oblique angle with respect to the vertically-extending plane.

14. The small cell base station antenna of claim 13, wherein at least one of the third oblique angle and the fourth oblique angle is greater than the first oblique angle.

15. The small cell base station antenna of claim 9, wherein the second and third side faces of the tubular reflector assembly are connected by at least one hinge.

16. The small cell base station antenna of claim 9, wherein the first and second linear arrays of radiating elements are configured to generate an antenna beam that has a generally peanut-shaped cross-section in the azimuth plane.

17. A network of strand-mounted small cell base station antennas, comprising
 a first strand that extends along a first set of poles;
 a first small cell base station antenna that is mounted on the first strand, the first small cell antenna comprising:
  a first backplane;
  a first linear array of radiating elements that includes at least one radiating element extending forwardly from the first backplane;
  a second backplane that is opposite the first backplane;
  a second linear array of radiating elements that includes at least one radiating element extending forwardly from the second backplane;
 a second small cell base station antenna that is mounted on the first strand, the second small cell base station antenna being adjacent the first small cell base station antenna, the second small cell antenna comprising:
  a third backplane;
  a third linear array of radiating elements that includes at least one radiating element extending forwardly from the third backplane;
  a fourth backplane that is opposite the third backplane;
  a fourth linear array of radiating elements that includes at least one radiating element extending forwardly from the fourth backplane;
 a second strand that extends along a second set of poles;
 a third small cell base station antenna that is mounted on the second strand, the third small cell antenna comprising:
  a fifth backplane;
  a fifth linear array of radiating elements that includes at least one radiating element extending forwardly from the fifth backplane;
  a sixth backplane that is opposite the fifth backplane;
  a sixth linear array of radiating elements that includes at least one radiating element extending forwardly from the sixth backplane;
 a fourth small cell base station antenna that is mounted on the second strand, the fourth small cell base station antenna being adjacent the third small cell base station antenna, the fourth small cell antenna comprising:
  a seventh backplane;
  a seventh linear array of radiating elements that includes at least one radiating element extending forwardly from the seventh backplane;
  an eighth backplane that is opposite the seventh backplane;
  an eighth linear array of radiating elements that includes at least one radiating element extending forwardly from the eighth backplane,
 wherein each of the first through fourth small cell base station antenna is configured to generate a respective antenna beam that has a generally peanut-shaped cross-section in the azimuth plane, wherein a boresight pointing direction of the second small cell base station antenna points between the third small cell base station antenna and the fourth small cell base station antenna and wherein a boresight pointing direction of the third small cell base station antenna points between the first small cell base station antenna and the second small cell base station antenna.

* * * * *

UNITED STATES PATENT AND TRADEMARK OFFICE
CERTIFICATE OF CORRECTION

| | |
|---|---|
| PATENT NO. | : 11,223,387 B2 |
| APPLICATION NO. | : 16/765254 |
| DATED | : January 11, 2022 |
| INVENTOR(S) | : Chamberlain et al. |

It is certified that error appears in the above-identified patent and that said Letters Patent is hereby corrected as shown below:

In the Claims

Column 21, Line 5, Claim 13:
Delete "wherein the third first side" insert -- wherein the first side --

Signed and Sealed this
Thirtieth Day of August, 2022

Katherine Kelly Vidal
*Director of the United States Patent and Trademark Office*